United States Patent [19]

Neissel et al.

[11] 4,097,330
[45] Jun. 27, 1978

[54] INSTRUMENTATION ASSEMBLY FOR NUCLEAR REACTOR

[75] Inventors: John P. Neissel, San Jose; Harry H. Hendon, Saratoga; James H. Terhune, San Jose, all of Calif.

[73] Assignee: General Electric Company, San Jose, Calif.

[21] Appl. No.: 758,171

[22] Filed: Jan. 10, 1977

[51] Int. Cl.² .............................................. G21C 17/10
[52] U.S. Cl. .................................. 176/19 R; 176/23; 176/DIG. 3; 250/518
[58] Field of Search ................................ 250/390–392, 250/518; 176/19, 23, 36 R, DIG. 3

[56] References Cited

U.S. PATENT DOCUMENTS

| | | | |
|---|---|---|---|
| 2,997,587 | 8/1961 | Mims | 176/19 R |
| 3,060,111 | 10/1962 | Sherman et al. | 176/19 R |
| 3,160,587 | 12/1964 | Steinberg et al. | 176/19 R |
| 3,716,450 | 2/1973 | Lions | 176/19 R |
| 3,724,268 | 4/1973 | Kuwaburg | 176/19 J |
| 3,751,333 | 8/1973 | Drummond et al. | 176/19 R |

OTHER PUBLICATIONS

Nuclear Engineering Handbook, H. Etherington, ed., McGraw-Hill Book Co., Inc. (1958), New York, pp. 8-56.

*Primary Examiner*—Samuel W. Engle
*Assistant Examiner*—S. A. Cangialosi
*Attorney, Agent, or Firm*—Ivor J. James, Jr.; Samuel E. Turner; Sam E. Laub

[57] ABSTRACT

In a moderated nuclear reactor core, an in-core neutron detector assembly with means for fixing the location of the detectors and for displacing the moderator in the vicinity of the detectors to thereby flatten and reduce the thermal neutron flux to which the neutron detectors are exposed.

20 Claims, 11 Drawing Figures

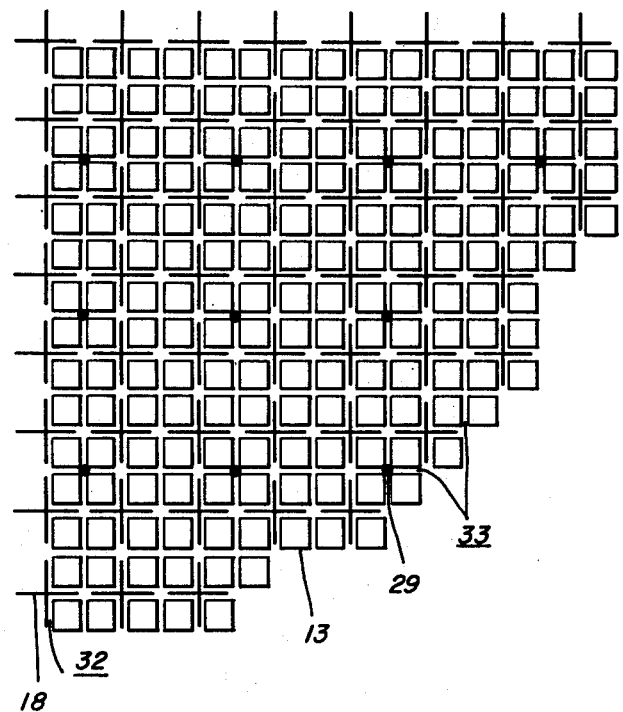
Fig. 2
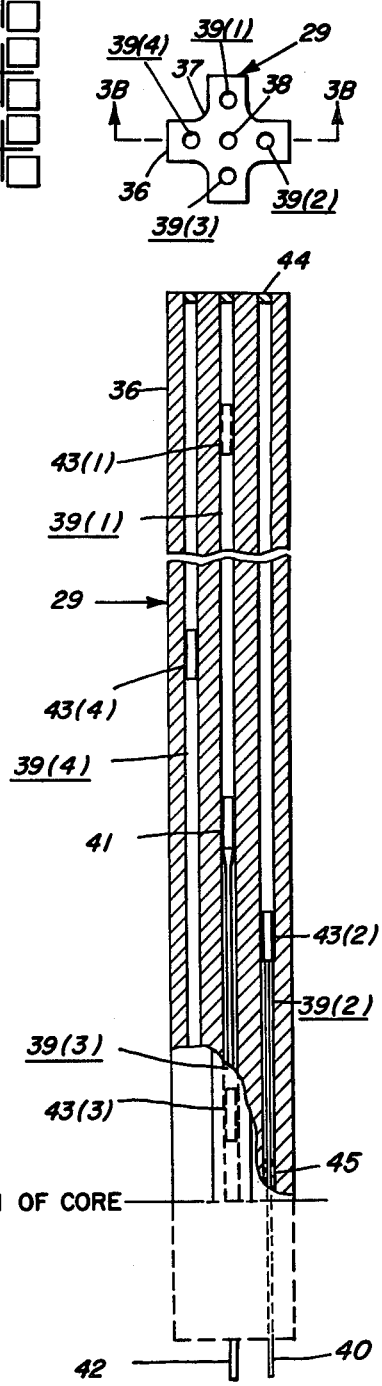
Fig. 3A
Fig. 3B

| Element | $\xi\Sigma_s$ (cm$^{-1}$) | $\Sigma_a$ (cm$^{-1}$) | Largest Suitable Cross-section Dimension (cm) |
|---|---|---|---|
| Niobium | 0.00594 | 0.0611 | 8.2 |
| Aluminum | 0.00608 | 0.0139 | 36.0 |
| Zinc | 0.00718 | 0.0696 | 7.2 |
| Zirconium | 0.00747 | 0.00772 | 33.0 |
| Molybdenum | 0.00927 | 0.160 | 3.1 |
| Titanium | 0.00939 | 0.320 | 1.6 |
| Chromium | 0.00949 | 0.241 | 2.1 |
| Magnesium | 0.0124 | 0.00271 | 20.0 |
| Vanadium | 0.0138 | 0.362 | 1.4 |
| Copper | 0.0190 | 0.313 | 1.6 |
| Iron | 0.0330 | 0.215 | 2.3 |
| Nickel | 0.0538 | 0.420 | 1.1 |
Fig. 6
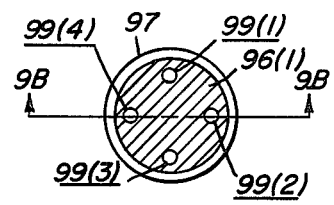
Fig. 9A
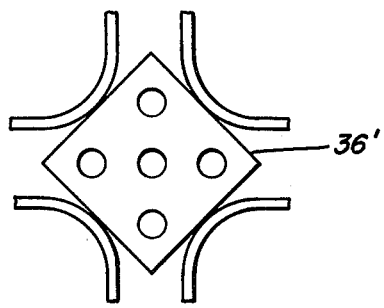
Fig. 7
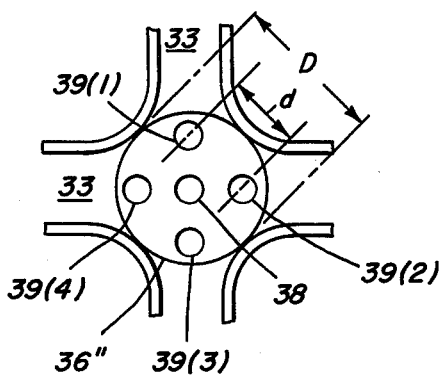
Fig. 8
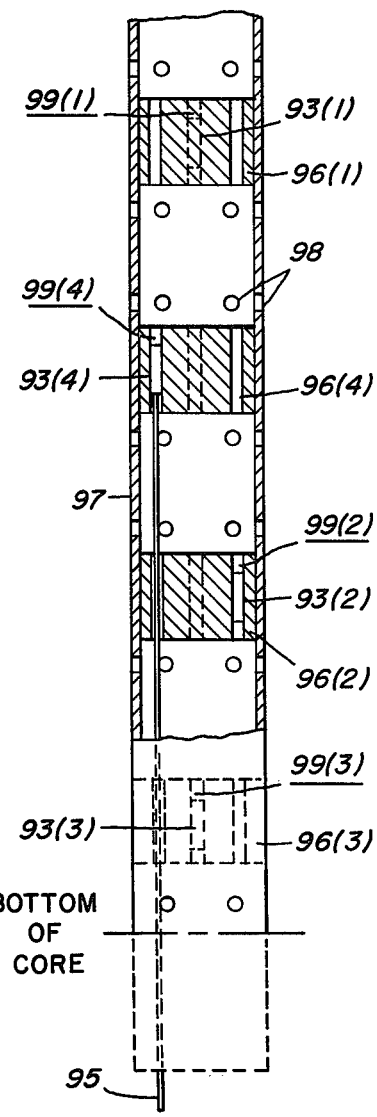
Fig. 9B

INSTRUMENTATION ASSEMBLY FOR NUCLEAR REACTOR

BACKGROUND

Reference is hereby made to the following copending application the benefit of the filing date of which is hereby claimed: U.S. Patent application Ser. No. 601,722, filed Aug. 4, 1975, now abandoned.

In known types of nuclear power reactors, for example as used in the Dresden Nuclear Power Station near Chicago, Illinois, the reactor core comprises a plurality of spaced fuel assemblies arranged in an array capable of self-sustained nuclear fission reaction. The core is contained in a pressure vessel wherein it is submerged in a working fluid, such as light water, which serves both as coolant and as a neutron moderator. A plurality of control rods, containing neutron absorbing material, are selectively insertable in the spaces or gaps among the fuel assemblies to control the reactivity of the core.

Each fuel assembly comprises a tubular flow channel, typically of approximately square cross section, containing an array of elongated, cladded fuel elements or rods supported between upper and lower tie plates. The fuel assemblies are supported in the pressure vessel between an upper core grid and a lower core support plate. The lower tie plate of each fuel assembly is formed with a nose piece which fits through an aperture in the core support plate into a pressurized coolant supply chamber. The nose piece is formed with openings through which the pressurized coolant flows upward through the fuel assembly flow channels to remove heat from the fuel elements. A typical fuel assembly of this type is shown, for example, by D. A. Venier et al in U.S. Pat. No. 3,350,275. For further information on nuclear power reactors see, for example, "Nuclear Power Engineering," M. M. El-Wakil, McGraw-Hill Book Company, Inc., 1962.

In nuclear reactors of recent design, in-core nuclear instrumentation, in the form of neutron detectors, is contained in instrumentation receptacles located in the spaces or gaps between the fuel assemblies. A neutron detector, in the form of a fission or ion chamber, and an assembly thereof for use in a reactor core is shown by L. R. Boyd et al in U.S. Pat. No. 3,043,954. Other types of detectors can be used, for example, a "self-powered" detector is shown by J. W. Hilborn in U.S. Pat. No. 3,375,370. Self-powered and ion chamber types of detectors advantageously can be combined as shown by J. P. Neissel in U.S. Pat. No. 3,760,183.

A system which utilizes the signal from such neutron detectors to monitor the local and bulk power levels in a nuclear reactor core is shown by G. R. Parkos et al in U.S. Pat. No. 3,565,760. The in-core neutron detector system shown therein (see FIGS. 2a 3 and 4 in particular) includes a plurality of instrumentation assembly tubes positioned in a spaced pattern in the water gaps or spaces between the fuel assemblies. Each instrumentation assembly tube contains a plurality (for example, four) of spaced in-core detectors positioned at separate, fixed different elevations or axial positions in the core. The instrumentation assembly tube also contains a tube for receiving a selectively insertable and axially movable detector often called a "traversing in-core probe" which is used to obtain axial neutron flux profile data and for calibration of the circuitry which receives and processes the signals from the fixed in-core detectors.

Neutrons which have been reduced to thermal energies are found to be the most effective in inducing fission when absorbed by an atom of fissile fuel. Thus in a thermal or water-moderated reactor core the fast fission neutrons produced by fuel fission are slowed down primarily by collisions with the hydrogen atoms of the water in which the core is submerged. Thus the proportion of thermal neutrons to fast neutrons is greatest at the center of the water "gaps" surrounding the fuel elements such as between the spaced fuel elements and between the spaced fuel assemblies.

Since the largest water gaps are between the fuel assemblies, this is where the thermal neutron flux "peaking" is most pronounced. In the type of nuclear core under discussion it is in these gaps that the in-core neutron detector assemblies are located. This positioning of the in-core neutron detectors presents several problems.

The substantial peaking of the thermal neutron flux in the water gap between fuel assemblies makes the detector signals dependent on the position of the detector with respect to the position of the thermal neutron flux peak. For the type of detector assembly shown in the above mentioned U.S. Pat. Nos. 3,043,954 and 3,565,760 this problem is aggravated by the fact that neither the fixed in-core detectors nor the tube for the traversing in-core probe are necessarily centered on the thermal neutron flux peak nor well fixed with respect thereto. This location of the detectors at positions of steep gradients of neutron flux results in undesirable uncertainty in the interpretation of the signals from the detectors.

The positioning of the detectors in the water gaps between fuel assemblies exposes the detectors to a higher level of thermal neutron flux than that to which the fuel rods are exposed. This results in undesirable uncertainty in the inferred power density of the fuel rods. Furthermore, where the in-core detectors are fission chambers (as described in the aforementioned U.S. Pat. No. 3,043,954) the fissionable material of the detector chamber is depleted more rapidly than desirable with the resulting necessity of earlier replacement.

The objective of this invention is to alleviate the foregoing problems by providing an in-core detector assembly which more precisely locates the detectors and which flattens and reduces the thermal neutron flux in the vicinity of the detectors.

SUMMARY

The objectives of the invention are achieved by surrounding the in-core detectors (and the traversing in-core probe passage) with a body of suitable material which provides fixed locations for the detectors and displaces the moderator in the vicinity of the detectors to thereby reduce and flatten the thermal neutron flux to which the detectors are exposed.

DRAWING

FIG. 2 is a plan view of a quadrant of a nuclear reactor core;

FIGS. 3A and 3B are plan and elevation views, respectively, of a neutron detector assembly embodying the invention;

FIG. 6 is a compilation of the pertinent characteristics of some materials from which the material of the moderator-displacing member of the invention can be selected;

FIG. 7 is a plan view of a form of the neutron detector assembly having a square cross section shape;

FIG. 8 is a plan view of a form of the neutron detector assembly having a circular cross section shape; and FIGS. 9A and 9B are plan and elevation views of an embodiment of the invention using separate axially spaced moderator-displacing members.

GENERAL DESCRIPTION

Figure 1:
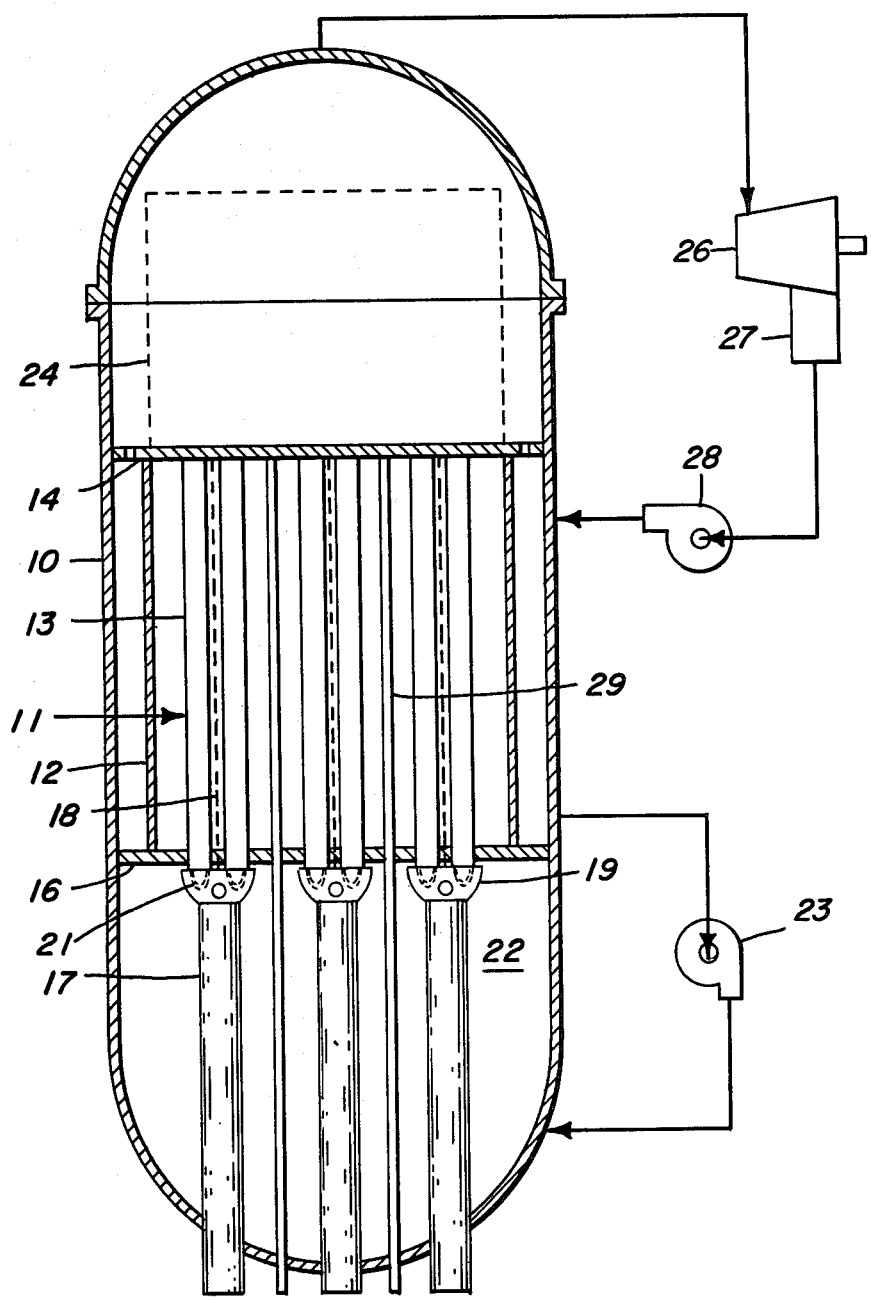
FIG. 1 is a schematic illustration of a water cooled and moderated nuclear reactor steam supply system.

Although not limited thereto, the invention is described herein as employed in a water cooled and moderated nuclear reactor of the boiling water type, an example of which is illustrated in simplified schematic form in FIG. 1. Such a reactor system includes a pressure vessel 10 containing a nuclear reactor core 11 submerged in a coolant-moderator such as light water. The core 11, which is surrounded by an annular shroud 12, includes a plurality of replaceable fuel assemblies 13 arranged in spaced relation between an upper core grid 14 and a lower core plate 16.

A plurality of control rod drive housing tubes 17 house control rod drives by which a plurality of control rods 18 are selectively insertable among the fuel assemblies 13 for control of the reactivity of the core. Each of the housing tubes 17 is fitted with a fuel assembly support member 19 each of which is formed with sockets for receiving the nose pieces 21 of four adjacent fuel assemblies. The nose pieces 21 and the support members 19 are formed with coolant passages or openings for communication with a coolant supply chamber 22. A coolant circulation pump 23 pressurizes the coolant in the supply chamber 23 from which the coolant is thus forced through the openings in support members 19 and the fuel assembly nose pieces upward through the fuel assemblies. A part of the coolant is thereby converted to steam which passes through a separator-dryer arrangement 24 to a utilization device such as a turbine 26. Condensate formed in a condenser 27 is returned as feedwater to the vessel 10 by a pump 28.

A plurality of instrumentation assemblies or receptacles 29 are positioned in spaced relation among the fuel assemblies and contain fixed neutron detectors for monitoring the neutron flux and hence the power level of the core over the power range of reactor operation. (The present invention is concerned with the portion of the instrumentation receptacles 29 that is within the core 11. That portion of these receptacles 29 that extends below the core and through the bottom of the pressure vessel 10 may take any suitable form.)

Each of the fuel assemblies 13 is formed of a plurality of elongated fuel rods supported in spaced relation by upper and lower tie plates (not shown) and surrounded by a tubular flow channel 31 (FIG. 4) which directs the coolant upward among the fuel rods. Each of the fuel rods comprises an elongates sealed container such as a tube containing fissile fuel, such as $UO_2$ or $PuO_2$ in the form of pellets, particles, powder or the like. More complete description of such a fuel assembly or bundle may be found, for example, in U.S. Pat. No. 3,431,170.

Shown in plan view in FIG. 2 is one quadrant of an example reactor core to illustrate the relative relationship and spacing of the fuel assemblies 13, the control rods 18, positioned in water gaps 32, and instrumentation assemblies 29, positioned according to a predetermined pattern in water gaps 33.

One form of an in-core neutron detector assembly 29 of the invention is illustrated in FIGS. 3A and 3B. The assembly comprises an elongated moderator-displacing receptacle member 36 formed of a suitable material, such as zirconium (as further discussed hereinafter) and having, in this embodiment, a cruciform cross-section shape with curved portions 37 shaped to substantially match the curves of the corners of the adjacent fuel assembly channels 31, as illustrated in FIG. 4, whereby the member 36 is well-located between the fuel assemblies.

The moderator-displacing member 36 is formed of a body of solid metal and it is sufficiently rigid to be self supporting by attachment to, for example, the bottom core support structure (not shown). The member 36 extends upward between the fuel assemblies to a height at least equal to the active height of the core, that is, the portion of the height of the core containing nuclear fuel.

Figures 4, 5:
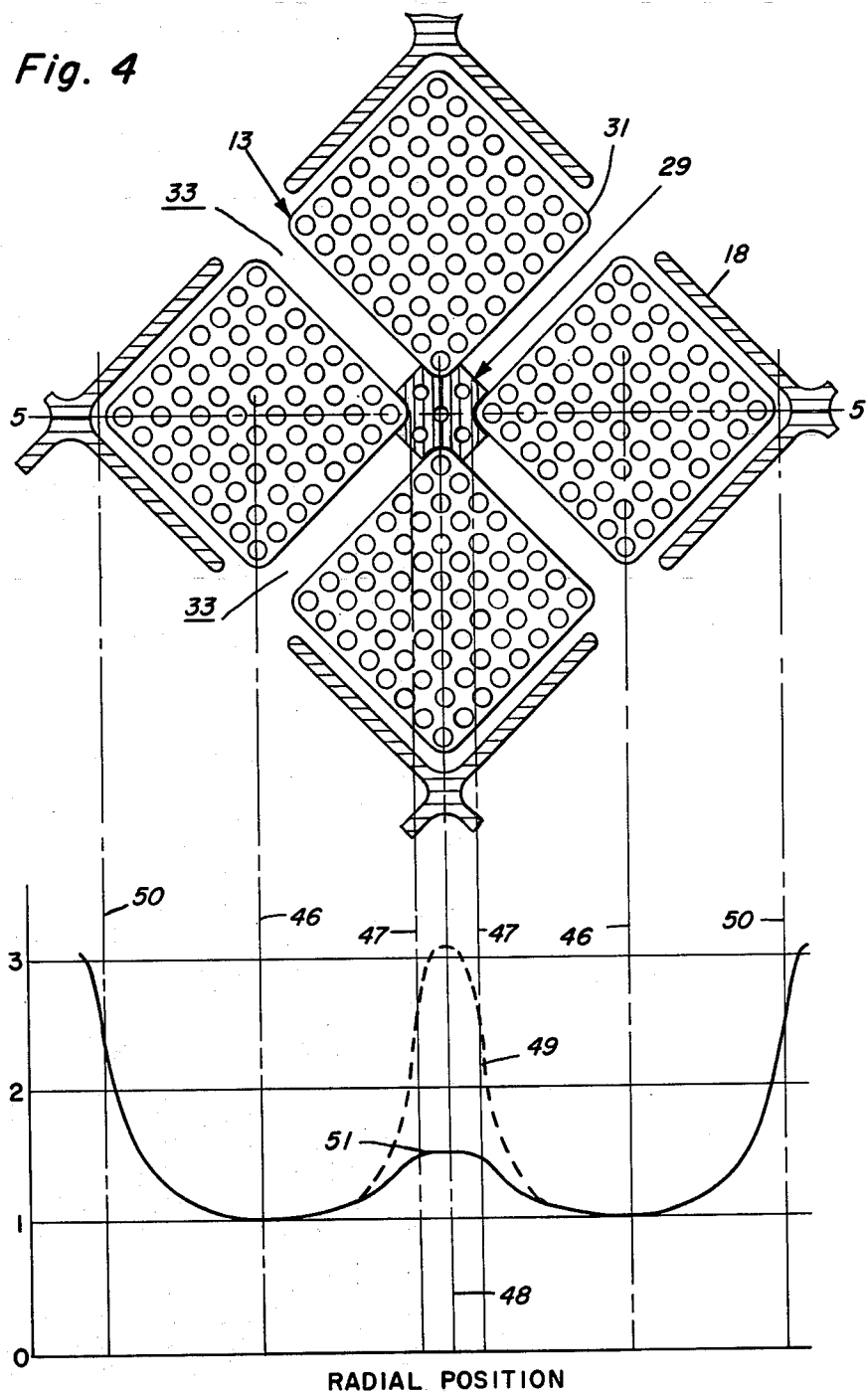
FIG. 4 is a plan view of a local portion of a reactor core illustrating the neutron detector assembly of the invention as positioned between four adjacent fuel assemblies.
FIG. 5 is a plot of relative thermal neutron flux along the line 5—5 of FIG. 4 illustrating the effectiveness of the invention.

As illustrated in FIG. 4, the transverse cross section dimensions of the member 36 are equal to the diagonal distance between the four adjacent fuel assemblies 13 (less a tolerance necessary for insertion, removal and thermal expansion of the fuel assemblies) whereby the moderator in the space between the four fuel assemblies is essentially completely displaced.

The receptacle member 36 is formed with a plurality of longitudinally extending passages or holes to receive the neutron detectors including a central passage 38 and outer passages 39 (1) – 39 (4). The central passage 38 receives a neutron detector 41 which is attached to the flexible cable 42 (which includes suitable detector signal conductors) by which the detector 41 can be driven into and withdrawn from the passage 38 (by drive means not shown) whereby the detector 41 serves as a traversing in-core probe by which a complete axial neutron flux profile can be obtained.

Each of the passages 39 (1) – 39 (4) is adapted to receive a respective fixed in-core detector. As illustrated in FIG. 3B each of the passages 39 (1) – 39 (4) contains a respective one of a plurality of fixed detectors 43 (1) – 43 (4) each located at a different elevation or axial position. Suitable detector signal conducting cables such as cable 40 connect the detectors 43 (1) – 43 (4) to suitable signal processing equipment such a shown in the previously mentioned U.S. Pat. No. 3,565,760. The passages 38 and 39 (1) – 39 (4) may be sealed at the top of member 36 by plugs 44 and at the bottom of member 36 the signal conducting cables may be sealed in the passages as shown at 45 to prevent entry of coolant into the passages.

The effectiveness of the present invention in reducing the magnitude and gradient (spacial rate-of-change or slope) of the neutron flux in the vicinity in the in-core detectors in water gap 33 is illustrated in FIGS. 4 and 5. FIG. 4 is an enlarged plan view of a local portion of the fuel core showing detector assembly 29 positioned between the corners of four adjacent fuel assemblies 13. In FIG. 5 (which is a plot of neutron flux along the line 5—5 of FIG. 4 assuming that adjacent control rods are fully withdrawn) lines 50 are the outer edges of adjacent fuel assemblies, lines 46 are center lines of adjacent fuel assemblies, lines 47 are the edges of the fuel assemblies which define the gap 33 and line 48 is the center line of gap 33. For the purposes of illustrating the relative effect of the invention on the thermal neutron flux in gap 33 in the vicinity of the neutron detectors, the thermal neutron flux at lines 46 (that is, at the centers of the fuel assemblies) is taken as a relative level of one.

The dashed curve 49 represents the prior art case where in the absence of the present invention the moderator is not displaced from the vicinity of the neutron detectors. In such a case the calculated magnitude of the unperturbed thermal neutron flux at the center of the gap 33 is more than three times the flux at the center of the fuel assembly. Equally significant is the fact that the unperturbed flux gradient is very steep in the gap 33 making the placement of the detectors in the moderator gap highly sensitive to radial positioning.

The solid curve 51 represents the calculated unperturbed thermal neutron flux along the line 5—5 and through central passage 38 which is obtainable by use of the present invention. The unperturbed peak flux is reduced to about one-half and the gradient of the flux in the gap 33 is greatly reduced (that is, the flux is flattened). The reduction and flattening of the flux at passages 39 (1) – 39 (4) is qualitatively similar whereby the thermal neutron flux "seen" by the detectors is much more nearly equal to the average thermal neutron flux of the fuel assemblies and the sensitivity to radial position of the detectors is greatly lessened.

While the cross or cruciform cross section shape of the moderator-displacing member 36 of fIGS. 3A, 3B, and 4 is advantageous in providing matching surfaces with the adjacent fuel assemblies, other cross section shapes can be used. Thus, illustrated in FIG. 7 is a moderator-displacing member 36' having a square cross section shape while, illustrated in FIG. 8 is a moderator-displacing member 36" having a circular cross section shape.

Selection of the material from which the moderator-displacing receptacle member 36 is formed is an important consideration. Since this material displaces the moderator to decrease neutron moderation in the vicinity of the detectors, its neutron moderating ability should be low; that is, it should be substantially transparent to fast neutrons. Also, its absorption cross section for thermal neutrons should be low. Additionally, the material must be suitable for use in the high temperature water and high neutron and gamma flux environment of the nuclear reactor core.

More specifically, it is desirable that the slowing-down power of the material, which may be defined as $\xi\Sigma_s$, be small, where $\xi$ is the average logarithmic energy decrement per neutron collision and $\Sigma_s$ is the macroscopic scattering cross section of the material for fast neutrons. Also, the macroscopic absorption cross section for thermal neutrons $\Sigma_a$ should be small.

Examples of materials and their values of $\xi\Sigma_s$ and $\Sigma_a$ are listed in the chart of FIG. 6. It is noted, however, that the selection of a suitable material for member 36 is not restricted to those listed nor to a pure element but the material may be a mixture, alloy, compound for which the values of $\xi\Sigma_s$ and $\Sigma_a$ are suitably small. Some materials, such as zinc, are generally suitable only in alloy form. Also, some materials are desirably protected by a suitable cladding for use in the environment of the nuclear core or the member 36 may be formed as a composite of two or more materials. For example, copper can be plated with chromium and magnesium can be covered with a stainless steel sheath.

The cross section dimensions of the moderator-displacing member should be substantially shorter than the reciprocal of its slowing-down power for fast neutrons and substantially shorter than its mean free path for thermal neutrons so that the flux in the vicinity of the detectors will be substantially flattened.

Suitability of a metal for practical application as a moderator-displacing member is also a function of the available space between the fuel assemblies where the member is to be located. In order to maximize flux flattening and reduction, the moderator-displacing member should displace as much as possible of the moderator in the space between the fuel assemblies in the vicinity of the neutron detectors. On the other hand, members having transverse cross section dimensions which are in the order of the reciprocal of the slowing-down power of the particular material, produce undesirable flux peaking. To provide the desired flux flattening, it is found that the transverse cross section dimensions of the moderator-displacing member must be a fraction of the reciprocal of the slowing-down power of the particular material.

Thus as mentioned hereinbefore, the transverse cross section dimensions of the moderator-displacing member are made equal to the distance available between the fuel assemblies less a tolerance necessary for insertion, removal and thermal expansion of the fuel assemblies.

Thus given the maximum transverse cross section dimension for the moderator-displacing member the selection of a particular metal therefor is based upon the following criteria which have been determined to provide practical moderator-displacing members: The particular metal is selected such that the maximum transverse cross section dimension of the moderator-displacing member is less than one-fourth of the reciprocal of the slowing-down power of the metal for fast neutrons and less than one-half of the reciprocal of the macroscopic absorption cross section of the metal for thermal neutrons.

Given in the fourth column of the chart of FIG. 6 is the largest suitable transverse cross section dimension for the list metals. The values given are equal to one-fourth of the reciprocal of the slowing-down power or one-half the reciprocal of the macroscopic absorption cross section for slow neutrons whichever is less and therefore limiting. For example, if the moderator-displacing member has a transverse cross section dimension of 2.54 cm, it can be seen from FIG. 6 that a suitable metal from which it can be formed can be selected from the group niobium, aluminum, zinc, zirconium, molybdenum and magnesium.

In a known reactor core the gap 33 has a width of about 0.522 inches (1.326 cm) and the diagnoal or corner-to-corner distance D (FIG. 8) between the fuel assemblies is about 1.136 inches (2.885 cm) or about 3.25 times the reciprocal of the slowing-down power of water at 550° F. A moderator-displacing member 36" (FIG. 8) for use in such a core has a diameter of about 1.0 inch (2.54 cm) or, for example, about 0.019 times the reciprocal of the slowing-down power of zirconium. The selection of 2.54 cm as the diameter of the member 33" provides a tolerance of about 0.172 cm between the member and the fuel assemblies for necessary clearance for insertion, removal and thermal expansion of the fuel assemblies. The detector receiving passages or holes 38 and 39 (1) – 39 (4) are about 0.25 inches (0.635 cm) in diameter with center-to-center spacing diameter of about 0.442 inches (1.123 cm).

For the cruciform cross section shape (FIG. 3A) the length of the arms may be selected such that the arms extend beyond the centerlines of the detector receiving passages 39 (1) – 39 (4) by a distance of from one-half to one times the thickness of the arm. A greater extension of the arms is found to contribute little to flux reduction and flattening.

In the case of an in-core detector assembly which does not include a passage for a traversing in-core probe, it is not necessary in the practice of the invention for the moderator-displacing material to extend continuously from the bottom to the top of the core. It is sufficient if each fixed in-core detector is suitably surrounded by the moderator-displacing material. Such an embodiment of the invention is illustrated in FIGS. 9A and 9B. As shown therein each of a plurality of in-core detectors 93 (1) – 93 (4) is supported in and surrounded by a respective one of a plurality of spaced moderator-displacing members 96 (1) – 96 (4). Although not required, for convenience of manufacture, each of the members 96 (1) – 96 (4) may be formed with detector receiving holes 99 (1) – 99 (4). The "extra" holes in the members 96 (1) – 96 (4) provide convenient means for passage therethrough of the necessary signal conductors from the detectors, such as a conductor 95 from detector 93 (4) which may be passed through the holes 99 (4) of members 96 (2) and 96 (3).

The moderator-displacing members 96 (1) – 96 (4) may be attached to and supported in axially spaced relation by suitable means such as a thin-walled support member 97. The support member 97 may be formed with a plurality of openings or holes 98 to allow circulation of coolant-moderator between the moderator-displacing members 96 (1) – 96 (4). While the support member 97 and the moderator-displacing members 96 (1) – 96 (4) are shown in FIGS. 9A and 9B as having a circular cross-sectional shape, they may be formed in other suitable cross-sectional shapes such as cruciform or square.

Thus what has been described is a neutron detector assembly for use in a moderated nuclear reactor core which provides detector location and moderator-displacement for thermal neutron flux depression and flattening in the vicinity of the detectors.

What is claimed is:

1. A neutron detector assembly for use in a fluid moderated thermal neutron reactor core wherein said core includes a plurality of replaceable fuel assemblies of substantially square cross section shape and wherein said fuel assemblies are positioned in spaced relation to provide gaps for fluid moderator therebetween, comprising: an elongated solid moderator-displacing member adapted for positioning in said core between the corners of an adjacent four of said spaced fuel assemblies, said member extending through said core for a length at least equal to the active height of said core, said member having transverse cross section dimensions equal to the diagonal distance between the corners of said four fuel assemblies less a tolerance required for insertion, removal and thermal expansion of said fuel assemblies whereby the moderator in the space between said corners of said adjacent four fuel assemblies is substantially completely displaced to thereby depress and flatten the neutron flux therebetween, said moderator-displacing member being formed with at least one longitudinal passage for receiving a neutron detector for monitoring the neutron flux in said space over the power range of operation of said core, said moderator-displacing member being formed of a metal selected such that said transverse cross section dimensions thereof are less than one-fourth of the reciprocal of the slowing-down power of said metal for fast neutrons and less than one-half of the reciprocal of the macroscopic absorption cross of said metal for thermal neutrons.

2. The neutron detector assembly of claim 1 wherein said moderator-displacing member has a cruciform cross section shape.

3. The neutron detector assembly of claim 2 wherein said moderator-displacing member is formed with curved surfaces between adjacent arms of said cruciform shape.

4. The neutron detector assembly of claim 1 wherein said moderator-displacing member has a substantially square cross sectional shape.

5. The neutron detector assembly of claim 1 wherein said moderator-displacing member has a substantially circular cross sectional shape.

6. The neutron detector assembly of claim 1 wherein said moderator-displacing member is formed with a plurality of longitudinally extending passages for receiving a respective plurality of neutron detectors positioned at pre-determined longitudinally spaced positions in said passages.

7. The neutron detector assembly of claim 6 wherein said moderator-displacing member is additionally formed with a central longitudinally extending passage for receiving a selectively insertable neutron detector adapted for movement along the length of said central passage.

8. The neutron detector assembly of claim 1 wherein said moderator-displacing member is formed of a material selected from the group zirconium and alloys of zirconium.

9. The neutron detector assembly of claim 1 wherein said moderator-displacing member is formed of a material selected from the group niobium, aluminum, zinc, zirconium, molybdenum, magnesium and alloys thereof.

10. The neutron detector assembly of claim 1 including means for preventing moderator from entering said passage.

11. A neutron detector assembly for use in a fluid moderated thermal neutron reactor core wherein said core includes a plurality of fuel assemblies and wherein said fuel assemblies are spaced apart to provide gaps for fluid moderator therebetween, comprising: an elongated solid moderator-displacing member adapted for positioning in a space formed by said gaps between adjacent ones of said spaced fuel assemblies and extending into the active portion of said core, said moderator-displacing member being formed with at least one longitudinal passage for receiving a neutron detector for monitoring the neutron flux in said space over the power range of operation of said core, said member having transverse cross section dimensions equal to the transverse cross section dimensions of said space less a tolerance required for insertion, removal and thermal expansion of said fuel assemblies whereby the moderator in said space is substantially completely displaced, said member being formed of a metal selected such that the largest transverse cross section dimension of said member is less than one-fourth of the reciprocal of the slowing-down power of said metal for fast neutrons and less than one-half of the reciprocal of the macroscopic absorption cross section of said metal for thermal neutrons whereby the neutron flux in said space in the vicinity of said detector is depressed and flattened.

12. The neutron detector assembly of claim 11 wherein said moderator-displacing member has a cruciform cross section shape.

13. The neutron detector assembly of claim 12 wherein said moderator-displacing member is formed with curved surfaces between adjacent arms of said cruciform shape.

14. The neutron detector assembly of claim 11 wherein said moderator-displacing member has a substantially square cross sectional shape.

15. The neutron detector assembly of claim 11 wherein said moderator-displacing member has a substantially circular cross sectional shape.

16. The neutron detector assembly of claim 11 wherein said moderator-displacing member is formed with a plurality of longitudinally extending passages for receiving a respective plurality of neutron detectors positioned at pre-determined longitudinally spaced positions in said passages.

17. The neutron detector assembly of claim 16 wherein said moderator-displacing member is additionally formed with a central longitudinally extending passage for receiving a selectively insertable neutron detector adapted for movement along the length of said central passage.

18. The neutron detector assembly of claim 11 wherein said moderator-displacing member is formed of a material selected from the group zirconium and alloys of zirconium.

19. The neutron detector assembly of claim 11 wherein said moderator-displacing member is formed of a material selected from the group niobium, aluminum, zinc, zirconium, molybdenum, magnesium, and alloys thereof.

20. The neutron detector assembly of claim 11 including means for preventing moderator from entering said passage.

* * * * *